United States Patent
Antanaitis et al.

(10) Patent No.: US 9,889,835 B1
(45) Date of Patent: Feb. 13, 2018

(54) ACTIVE BRAKE RETRACTION SYSTEM WITH VACUUM RESERVOIR

(71) Applicant: GM GLOBAL TECHNOLOGY OPERATIONS LLC, Detroit, MI (US)

(72) Inventors: David B. Antanaitis, Northville, MI (US); Kevin D. Connor, Armada, MI (US); Douglas N. Reed, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/229,268

(22) Filed: Aug. 5, 2016

(51) Int. Cl.
*B60T 13/22* (2006.01)
*B60T 13/72* (2006.01)
*B60T 13/565* (2006.01)
*B60T 8/42* (2006.01)
*F16D 55/00* (2006.01)

(52) U.S. Cl.
CPC ............ *B60T 13/72* (2013.01); *B60T 8/4225* (2013.01); *B60T 13/565* (2013.01); *B60T 8/4216* (2013.01); *F16D 2055/0029* (2013.01)

(58) Field of Classification Search
CPC ........... F16D 2055/0029; B60T 8/4225; B60T 8/4216
See application file for complete search history.

(56) References Cited

U.S. PATENT DOCUMENTS

| | | | |
|---|---|---|---|
| 3,590,963 A * | 7/1971 | Wright | B60T 17/221 141/27 |
| 6,220,675 B1 * | 4/2001 | Steffes | B60T 8/341 303/11 |
| 6,286,635 B1 * | 9/2001 | Tamor | B60L 7/26 180/65.21 |
| 2007/0216218 A1 * | 9/2007 | Matsushita | B60T 8/4081 303/20 |
| 2008/0265663 A1 * | 10/2008 | Leach | B60T 8/00 303/10 |
| 2010/0253136 A1 * | 10/2010 | Greer | B60T 8/4275 303/84.2 |
| 2011/0006596 A1 * | 1/2011 | Leiber | B60T 8/00 303/13 |
| 2013/0277156 A1 * | 10/2013 | Yang | B60T 13/147 188/72.3 |
| 2015/0183412 A1 * | 7/2015 | Lim | B60T 8/58 303/155 |

* cited by examiner

*Primary Examiner* — Nicholas J Lane

(57) ABSTRACT

A vehicle includes a brake system. The brake system includes a hydraulic brake line having a line pressure. The vehicle additionally includes a vacuum reservoir. The vacuum reservoir is selectively fluidly coupled to the hydraulic brake line. The vacuum reservoir is configured to, when fluidly coupled to the hydraulic brake line, reduce the line pressure during a drive cycle.

14 Claims, 3 Drawing Sheets

ACTIVE BRAKE RETRACTION SYSTEM WITH VACUUM RESERVOIR

TECHNICAL FIELD

The present disclosure relates to a braking system for an automotive vehicle, and more particularly to a system and method of retracting brake pads from associated brake rotors.

INTRODUCTION

Conventional automotive vehicles generally make use of disk brake systems for applying frictional braking torque to vehicle traction wheels. Disk brake systems generally utilize, at each wheel, a brake rotor connected to an axle hub of a rotatable axle of the vehicle. A set of selectively movable brake pads are connected to a non-rotating brake caliper. The brake rotor includes a disk-shaped rotor cheek having brake pad engagement surfaces. When braking is requested, e.g. via an operator application of a brake pedal, the braking system causes the caliper to press the brake pads upon respective brake pad engagement surfaces of the rotor cheek. Frictional interaction between the rotating rotor cheek and non-rotating brake pads causes braking of the motor vehicle. The rate of braking varies with the pressure of the brake pads against the respective brake pad engagement surfaces of the rotor cheek.

Dual-circuit hydraulic braking systems for automotive applications typically include an operator-actuated brake actuation unit, such as a tandem master cylinder actuated by a booster-aided brake pedal, by which to supply a first pressurized brake fluid to each of a first pair of wheel brakes via a first or "primary" braking circuit, and a second pressurized brake fluid to each of a second pair of wheel brakes via a second or "secondary" braking circuit. The use of wholly redundant braking circuits for operating discrete pairs of wheel brakes ensures continued vehicle braking capability, notwithstanding a degradation of performance of one of the braking circuits.

SUMMARY

A vehicle according to the present disclosure includes a brake system. The brake system includes a hydraulic brake line having a line pressure. The vehicle additionally includes a vacuum reservoir. The vacuum reservoir is selectively fluidly coupled to the hydraulic brake line. The vacuum reservoir is configured to, when fluidly coupled to the hydraulic brake line, reduce the line pressure during a drive cycle.

According to various embodiments, the vehicle additionally includes a brake caliper coupled to the hydraulic brake line, a first brake pad coupled to the caliper, and a second brake pad coupled to the caliper. In response to a reduction in line pressure, the brake caliper retracts the first brake pad and second brake pad away from one another.

According to various embodiments, the vacuum source includes a vacuum pump.

According to various embodiments, the vehicle additionally includes a vacuum source, a first valve configured to selectively fluidly couple the vacuum source to the vacuum reservoir, and a second valve configured to selectively fluidly couple the vacuum reservoir to the hydraulic brake line. In such embodiments, a controller may be configured to control the first valve to selectively fluidly couple the vacuum source to the vacuum reservoir, and to control the second valve to selectively fluidly couple the vacuum reservoir to the hydraulic brake line. The controller may be configured to, in response to a first operating condition, control the first valve to fluidly couple the vacuum source to the vacuum reservoir and to control the second valve to fluidly isolate the vacuum reservoir from the hydraulic brake line. The controller may also be configured to, in response to a second operating condition, control the first valve to fluidly isolate the vacuum source from the vacuum reservoir and control the second valve to fluidly couple the vacuum reservoir to the hydraulic brake line. The first operating condition may include a brake application exceeding a first calibrated threshold and subsequently falling below a second calibrated threshold.

A brake system for a vehicle according to the present disclosure includes a hydraulic brake line. The line has a fluid retained therein with a fluid pressure. The brake system additionally includes a vacuum reservoir. The vacuum reservoir is selectively fluidly coupled to the brake line. The vacuum reservoir is configured to, when fluidly coupled to the hydraulic brake line, reduce the line pressure during a drive cycle.

According to various embodiments, the brake system additionally includes a brake caliper coupled to the hydraulic brake line, a first brake pad coupled to the caliper, and a second brake pad coupled to the caliper, wherein in response to a reduction in line pressure, the brake caliper retracts the first brake pad and second brake pad away from one another.

According to various embodiments, the vacuum source includes a vacuum pump.

According to various embodiments, the brake system additionally includes a vacuum source, a first valve, and a second valve. The first valve is configured to selectively fluidly couple the vacuum source to the vacuum reservoir, and the second valve is configured to selectively fluidly couple the vacuum reservoir to the hydraulic brake line. In such embodiments, a controller may be configured to control the first valve to selectively fluidly couple the vacuum source to the vacuum reservoir, and to control the second valve to selectively fluidly couple the vacuum reservoir to the hydraulic brake line. The controller may be configured to, in response to a first operating condition, control the first valve to fluidly couple the vacuum source to the vacuum reservoir and to control the second valve to fluidly isolate the vacuum reservoir from the hydraulic brake line. The controller may also be configured to, in response to a second operating condition, control the first valve to fluidly isolate the vacuum source from the vacuum reservoir and control the second valve to fluidly couple the vacuum reservoir to the hydraulic brake line. The first operating condition may include a brake application exceeding a first calibrated threshold and subsequently falling below a second calibrated threshold. The first valve may include a first solenoid and the second valve may include a second solenoid.

A method for controlling a brake system for a vehicle includes providing a vehicle with a hydraulic brake line with a fluid retained therein, a vacuum reservoir, and a first valve selectively fluidly coupling the brake line to the vacuum reservoir. In response to a first operating condition during a drive cycle, the first valve is controlled to fluidly couple the vacuum reservoir to the brake line to reduce pressure in the brake line. In response to a second operating condition during the drive cycle, the first valve is controlled to fluidly isolate the vacuum reservoir from the brake line.

According to various embodiments, the method additionally includes providing the vehicle with a vacuum source and a second valve selectively fluidly coupling the vacuum reservoir to the vacuum source. In such embodiments, in response to the first operating condition during the drive cycle, the second valve is controlled to fluidly isolate the vacuum source from the vacuum reservoir. In response to the second operating condition during the drive cycle, the second valve is controlled to fluidly couple the vacuum source to the vacuum reservoir.

According to various embodiments, the first operating condition corresponds to a brake application exceeding a first calibrated threshold and subsequently falling below a second calibrated threshold, to vehicle speed being above a threshold and brake application being below a threshold, and/or to a vehicle cruise condition. The second condition may correspond to an anticipated braking request.

Embodiments according to the present disclosure provide a number of advantages. For example, systems and methods according to the present disclosure may ensure adequate clearance between brake rotors and brake pads, reducing residual brake drag. This may reduce wear and tear on brake components, and may also increase fuel economy.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
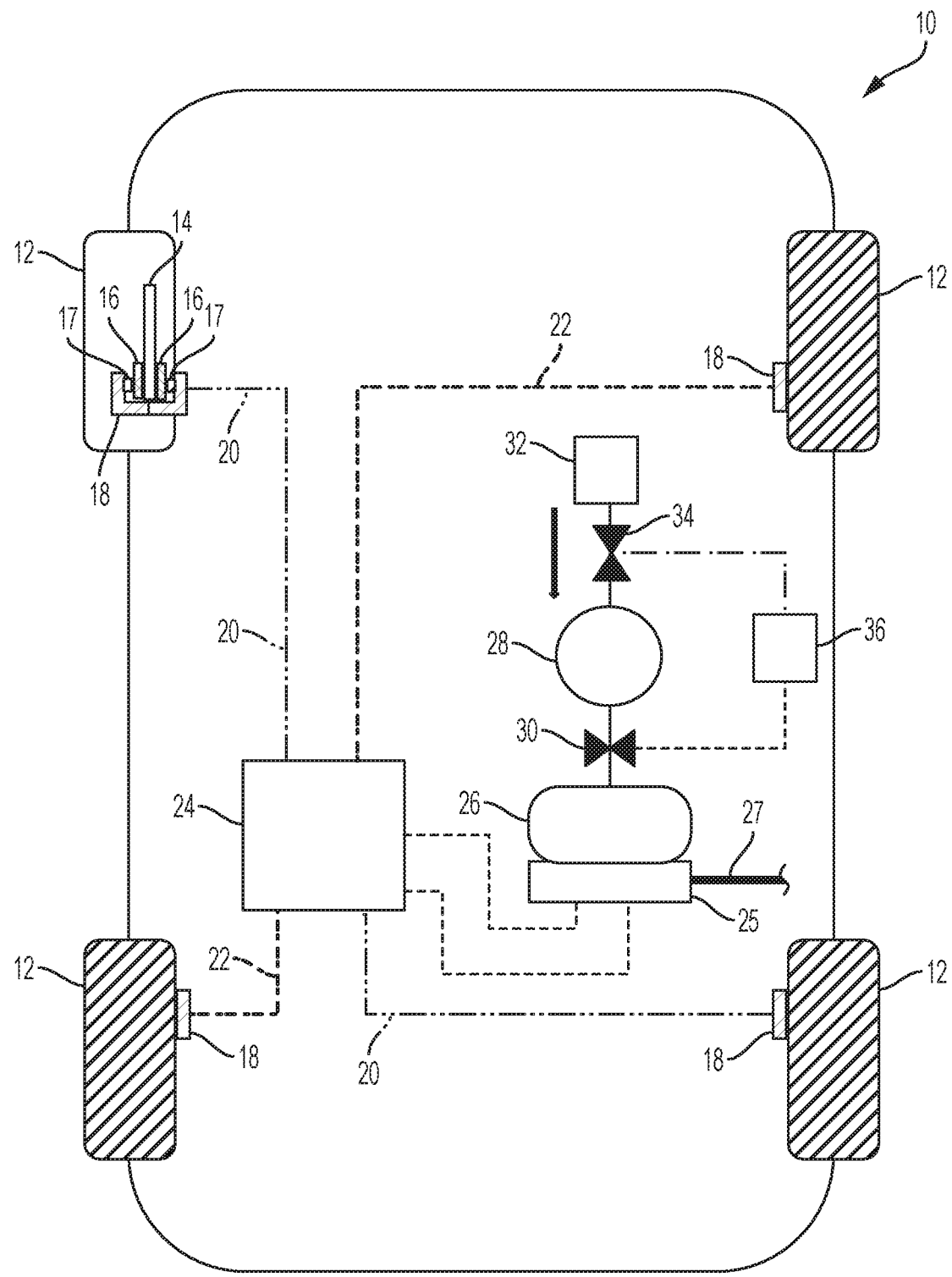
FIG. 1 is a schematic illustration of an embodiment of an automotive vehicle according to the present disclosure.

Referring now to FIG. 1, an embodiment of a vehicle according to the present disclosure is illustrated in schematic form. The vehicle 10 includes a plurality of vehicle traction wheels 12. Each wheel 12 is provided with a brake rotor 14 arranged to rotate with the wheel 12. At least two brake pads 16 are disposed proximate each brake rotor 14. The brake pads 16 are carried by pistons 17, which are in turn slidably retained by a brake caliper 18. The caliper 18, pistons 17, and brake pads 16 do not rotate with the wheel 12.

The pistons 17 are configured to slide relative to the caliper 18 in an application direction, i.e. inward toward the brake rotor 14, and in a retraction direction, i.e. outward and away from the brake rotor 14. When braking is requested, e.g. via a driver application of a brake pedal or a request from an automated driving system of an autonomous vehicle, the pistons 17 move in the application direction relative to the caliper 18, such that the brake pads 16 apply a frictional force to the brake rotor 14 to brake the associated wheel 12. When the braking request terminates, the pistons move in the retraction direction relative to the caliper 18 to provide a clearance between the brake rotor 14 and the brake pads 16. The clearance is provided such that residual drag between the brake pads 16 and brake rotor 14 is avoided. Such residual drag may cause unnecessary wear on the brake rotor 14 and brake pads 16, and may also result in a reduction in fuel economy.

Conventionally, the retraction is caused by an elastic seal member provided between the caliper 18 and the pistons 17. When the pistons 17 slide in the application direction relative to the caliper 18, the seal member is elastically deformed. The seal member applies a return force on the piston to return the piston and brake pad in the retraction direction when the brakes are released.

While only one assembly of brake rotor 14, brake pads 16, pistons 17, and caliper 18 is illustrated for simplicity, it should be understood that each wheel 12 is similarly provided with brake pads 16, pistons 17, and a brake rotor 14.

A first fluid circuit 20, which may be referred to as a primary circuit, supplies fluid to two of the brake calipers 18, and a second fluid circuit 22, which may be referred to as a secondary circuit, supplies fluid to two additional brake calipers 18. The first circuit 20 and second circuit 22 are filled with a fluid, e.g. a brake fluid. A pressure boost module 24 controls distribution of the fluid in the first circuit 20 and second circuit 22. When braking is desired, the pressure boost module 24 increases fluid pressure in the first circuit 20 and second circuit 22. According to various embodiments, the pressure boost module 24 may include an ABS module, an electric brake boost module, or other appropriate pressure boost modules. The first circuit 20 and the second circuit 22 are also in fluid communication with a master cylinder 25, which is in turn in supplied with fluid by a brake fluid reservoir 26. The master cylinder 25 is configured to convert motion of a shaft 27 to a hydraulic pressure in the first circuit 20 and second circuit 22. The shaft 27 may be directly or indirectly controlled by a brake pedal and/or in response to commands from an automated driving system of an autonomous vehicle.

A vacuum reservoir 28 is selectively coupled to the brake fluid reservoir 26 by a first valve 30. The vacuum reservoir 28 is, in turn, selectively coupled to a vacuum source 32 by a second valve 34. In an exemplary embodiment, the first valve 30 and the second valve 34 include solenoid valves. The vacuum source 32 may, in various embodiments, include a vacuum pump, an intake manifold of an internal combustion engine, other vacuum known vacuum sources, or a combination thereof.

The first valve 30 and the second valve 32 are under the control of a controller 36. The controller 36 is configured to control the first valve 30 and the second valve 32 according to various modes, including an engaged mode and a disengaged mode.

While illustrated as a single unit, the controller 36 and one or more other controllers can collectively be referred to as a "controller." The controller 36 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The disengaged mode is illustrated in FIG. 1. In the disengaged mode, the first valve 30 is closed to fluidly isolate the vacuum reservoir 28 from the brake fluid reservoir 26. With the first valve 30 closed, the master cylinder 25 may be vented to equalize pressure in the brake fluid reservoir 26, the first circuit 20, and the second circuit 22 to atmospheric pressure. The second valve 34 is open to fluidly couple the vacuum reservoir 28 to the vacuum source 32. The vacuum source 32 may thus charge the vacuum reservoir 28 by reducing the pressure in the vacuum reservoir 28, e.g. to a calibrated pressure level below atmospheric pressure.

In the disengaged mode, retraction of the brake pads 16 is driven by the elastic seal member provided between the caliper 18 and the pistons 17.

Figure 2:
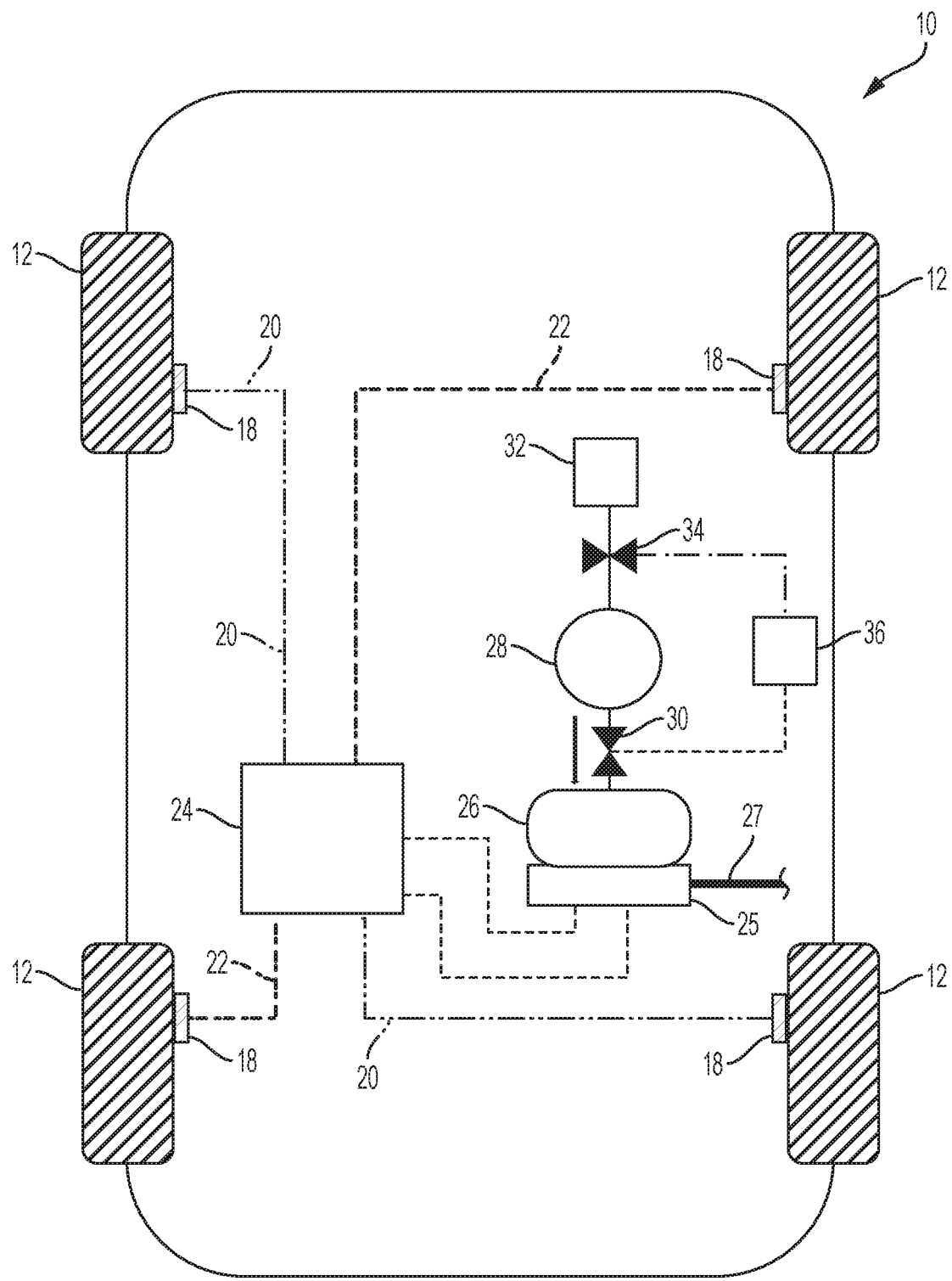
FIG. 2 is another schematic illustration of an embodiment of an automotive vehicle according to the present disclosure.

In response to at least one operating condition, the controller 36 may control the first valve 30 and the second valve 34 according to the engaged mode, illustrated in FIG. 2. According to various embodiments, the operating condition corresponds to a sustained acceleration condition, cruise condition, or other condition in which brakes are not applied and imminent braking is not anticipated. In an exemplary embodiment, the operating condition corresponds to a braking request terminating after the braking requests exceeds a calibrated threshold. In another exemplary embodiment, the operating condition corresponds to vehicle speed being above a threshold with no brakes applied.

In the engaged mode, the second valve 34 is closed to fluidly isolate the vacuum reservoir 28 from the vacuum source 32. The first valve 30 is opened to fluidly couple the vacuum reservoir 28 to the brake fluid reservoir 26. The vacuum reservoir 28 may thus reduce the pressure in the brake fluid reservoir 26.

Moreover, because the engaged mode is active when brakes are released, the compensating ports of the master cylinder 25 are open. Thus, pressure the first circuit 20 and the second circuit 22 is reduced below atmospheric pressure. A pressure differential may thereby be created across the pistons 17. The pressure differential urges the pistons 17 and brake pads 16 in the retraction direction. This additional retraction may reduce or eliminate residual brake drag from the brake pads 16 contacting the brake rotor 14. In some instances, this may result in up to 1 NM reduction in drag torque for a given caliper 18.

As the pistons 17 slide in the retraction direction, fluid is displaced into the brake fluid reservoir 26. The total air volume in the fluid and in the vacuum reservoir 28 is thereby reduced. This reduces the vacuum in the system, in turn reducing the pressure differential across the pistons 17.

The initial suction rate and rate of decay of suction may be tuned by adjusting the internal volume of the vacuum reservoir 28. The volume of the vacuum reservoir 28 may be selected for a given application such that the suction produced is adequate to retract the pistons 17 a desired distance, but low enough to avoid retracting the pistons 17 beyond a predefined maximum retraction distance.

In an exemplary embodiment, a brake pre-fill feature may return the brakes to a normal operating condition prior to a subsequent braking event.

Other embodiments having alternate configurations are contemplated within the scope of the present disclosure. For example, the vacuum reservoir may be integrated into the brake fluid reservoir as a combined reservoir with a vacuum chamber and a fluid chamber. In such an embodiment, a valve selectively couples the vacuum chamber and the fluid chamber.

Figure 3:
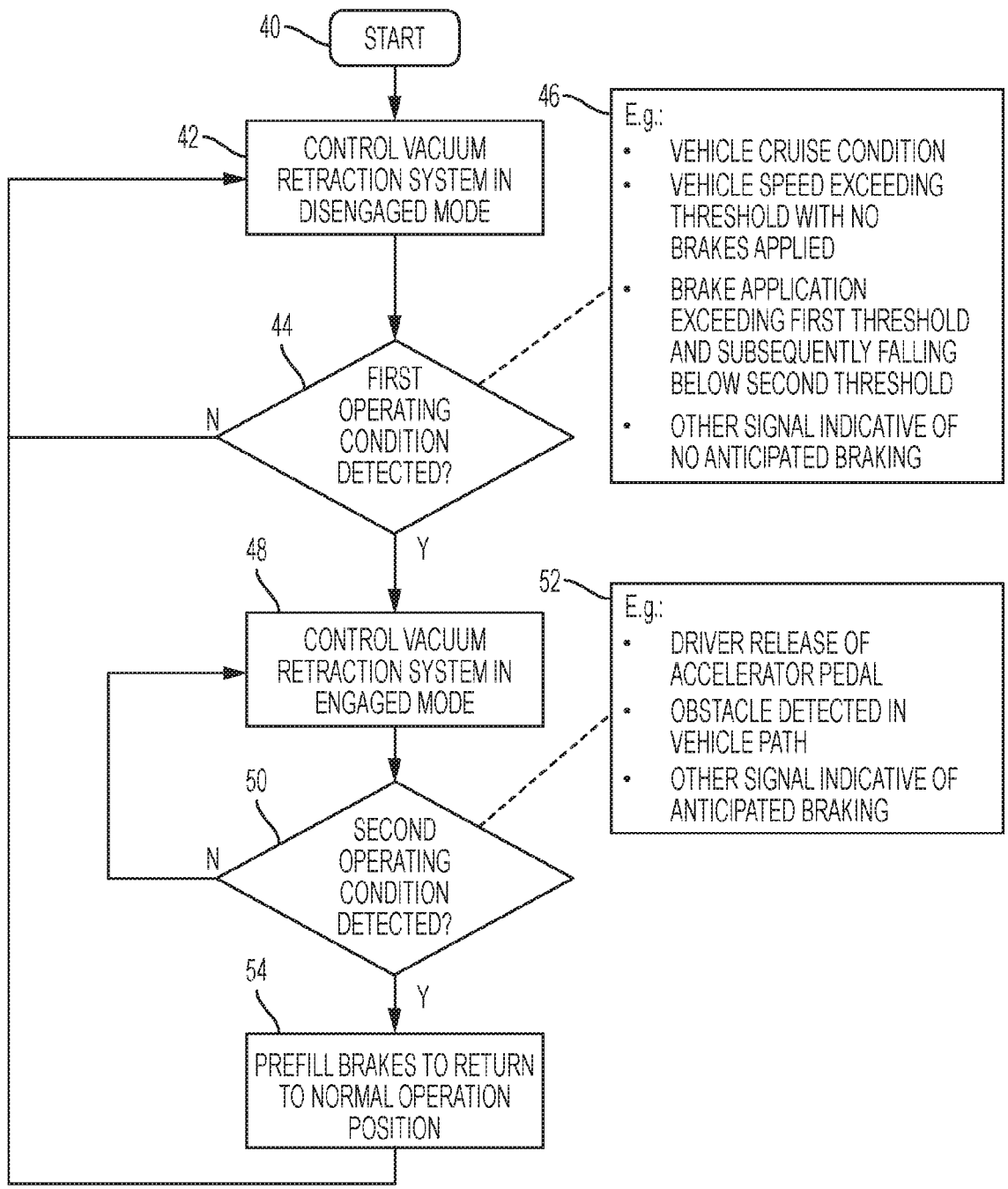
FIG. 3 is a flowchart representation of a method for controlling a braking system of a vehicle according to the present disclosure.

Referring now to FIG. 3, a method of controlling a brake system according to the present disclosure is illustrated in flowchart form. The method begins at block 40.

A vacuum retraction system is controlled in a disengaged mode, as illustrated at block 42. In an exemplary embodiment, the vacuum system includes a vacuum reservoir, vacuum source, first and second valves, and a controller as illustrated in the embodiment of FIGS. 1 and 2. In this exemplary embodiment, controlling the vacuum retraction system in the engaged mode includes fluidly coupling the vacuum source to the vacuum reservoir, and fluidly isolating the vacuum reservoir from a brake fluid reservoir, as illustrated in the embodiment of FIG. 1.

At operation 44, a determination is made of whether a first operating condition is detected. As illustrated in block 46, the first operating condition may correspond to a signal indicative of no braking being anticipated. Examples of such conditions include a vehicle cruise condition, vehicle speed exceeding a threshold with no brakes being applied, a brake request exceeding a first calibrated threshold and subsequently falling below a second calibrated threshold, or any combination thereof. In various embodiments, the braking request may be received via an operator actuation of a brake pedal, a braking command from an automated driving system in an autonomous vehicle, or other source as appropriate.

If the determination of operation 44 is negative, control returns to block 42 and the vacuum retraction system continues to be controlled in the disengaged mode. If the determination of operation 44 is positive, control proceeds to block 48.

At block 48, the vacuum retraction system is controlled in the engaged mode. In an exemplary embodiment, controlling the vacuum retraction system in the engaged mode includes fluidly isolating the vacuum source from the vacuum reservoir, and fluidly coupling the vacuum reservoir to the brake fluid reservoir, as illustrated in the embodiment of FIG. 2.

In an exemplary embodiment, a calibrated delay timer is instituted before controlling the vacuum retraction system to the engaged mode, e.g. between the first operating condition being detected in operation 44 and the vacuum retraction system being controlled in the engaged mode in block 48. In the exemplary embodiment, rapid engagement and disengagement of the vacuum retraction system during stop-and-go traffic, for example, is avoided.

Control then proceeds to operation 50. At operation 50, a determination is made of whether a second operating condition is detected. As illustrated at block 52, the second operating condition may correspond to a signal indicating that braking is anticipated. Examples of such conditions include an operator release of an accelerator pedal, a sensor reading indicating the presence of an obstacle in a path of the vehicle, or a combination thereof.

If the determination of operation 50 is negative, control returns to block 48 and the vacuum retraction system continues to be controlled in the engaged mode. If the determination of operation 50 is positive, control proceeds to block 54.

At block 54, a brake prefill feature is activated to return the brakes to normal operating condition. Control then returns to block 42 and the vacuum retraction system is controlled in the disengaged mode.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

As may be seen, systems and methods according to the present disclosure may ensure adequate clearance between brake rotors and brake pads, reducing residual brake drag. This may reduce wear and tear on brake components, and may also increase fuel economy.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction wheel;
   a brake system configured to apply braking torque to the traction wheel;
   a hydraulic brake line coupled to the brake system, the hydraulic brake line having a line pressure;
   a vacuum reservoir configured to selectively fluidly couple to the hydraulic brake line during a drive cycle and to, when fluidly coupled to the hydraulic brake line, reduce the line pressures;
   a vacuum source;
   a first valve configured to selectively fluidly couple the vacuum source to the vacuum reservoir;
   a second valve configured to selectively fluidly couple the vacuum reservoir to the hydraulic brake line; and
   a controller configured to control the first valve to selectively fluidly couple the vacuum source to the vacuum reservoir, and to control the second valve to selectively fluidly couple the vacuum reservoir to the hydraulic brake line, the controller being configured to, in response to a first operating condition, control the first valve to fluidly couple the vacuum source to the vacuum reservoir and to control the second valve to fluidly isolate the vacuum reservoir from the hydraulic brake line and, in response to a second operating condition, control the first valve to fluidly isolate the vacuum source from the vacuum reservoir and control the second valve to fluidly couple the vacuum reservoir to the hydraulic brake line.

2. The vehicle of claim 1, wherein the brake system includes a brake caliper coupled to the hydraulic brake line, a first brake pad coupled to the caliper, and a second brake pad coupled to the caliper, wherein in response to a reduction in line pressure, the brake caliper retracts the first brake pad and second brake pad away from one another.

3. The vehicle of claim 1, wherein the first operating condition includes a brake application initially exceeding a first calibrated threshold and subsequently falling below a second calibrated threshold.

4. The vehicle of claim 1, wherein the vacuum source comprises a vacuum pump.

5. A brake system for a vehicle, comprising:
   a hydraulic brake line having a fluid retained therein, the fluid having a line pressure;
   a vacuum reservoir fluidly couplable to the brake line, the vacuum reservoir being configured to, when fluidly coupled to the hydraulic brake line, reduce the line pressure during a drive cycle;
   a vacuum source;
   a first valve configured to selectively fluidly couple the vacuum source to the vacuum reservoir;

a second valve configured to selectively fluidly couple the vacuum reservoir to the hydraulic brake line; and a controller configured to, in response to a first operating condition, control the first valve to fluidly couple the vacuum source to the vacuum reservoir and to control the second valve to fluidly isolate the vacuum reservoir from the hydraulic brake line and, in response to a second operating condition, control the first valve to fluidly isolate the vacuum source from the vacuum reservoir and control the second valve to fluidly couple the vacuum reservoir to the hydraulic brake line.

6. The brake system of claim 5, further comprising a brake caliper coupled to the hydraulic brake line, a first brake pad coupled to the brake caliper, and a second brake pad coupled to the brake caliper, wherein in response to a reduction in line pressure, the brake caliper retracts the first brake pad and second brake pad away from one another.

7. The brake system of claim 5, wherein the first operating condition includes a brake application initially exceeding a first calibrated threshold and subsequently falling below a second calibrated threshold.

8. The brake system of claim 5, wherein the first valve includes a first solenoid and the second valve includes a second solenoid.

9. The brake system of claim 5, wherein the vacuum source comprises a vacuum pump.

10. A method for controlling a brake system for a vehicle, comprising:

providing a vehicle with a hydraulic brake line having a fluid retained therein, a vacuum reservoir, and a first valve selectively fluidly coupling the hydraulic brake line to the vacuum reservoir;

providing the vehicle with a vacuum source and a second valve selectively fluidly coupling the vacuum reservoir to the vacuum source;

in response to a first operating condition during a drive cycle, controlling the first valve to fluidly couple the vacuum reservoir to the hydraulic brake line to reduce pressure in the hydraulic brake line and controlling the second valve to fluidly isolate the vacuum source from the vacuum reservoir; and in response to a second operating condition during the drive cycle, controlling the first valve to fluidly isolate the vacuum reservoir from the hydraulic brake line controlling the second valve to fluidly couple the vacuum source to the vacuum reservoir.

11. The method of claim 10, wherein the first operating condition corresponds to a brake application initially exceeding a first calibrated threshold and subsequently falling below a second calibrated threshold.

12. The method of claim 10, wherein the first operating condition corresponds to vehicle speed exceeding a speed threshold and brake application below a brake threshold.

13. The method of claim 10, wherein the first operating condition corresponds to a vehicle cruise condition.

14. The method of claim 10, wherein the second operating condition corresponds to an anticipated braking request.

* * * * *